Feb. 19, 1935.  R. M. HOPKINS  1,991,504
KEY TRAPPING VALVE LOCK FOR TRANSMITTER SUPERVISED SPRINKLER SYSTEMS
Original Filed Sept. 12, 1928   3 Sheets-Sheet 1
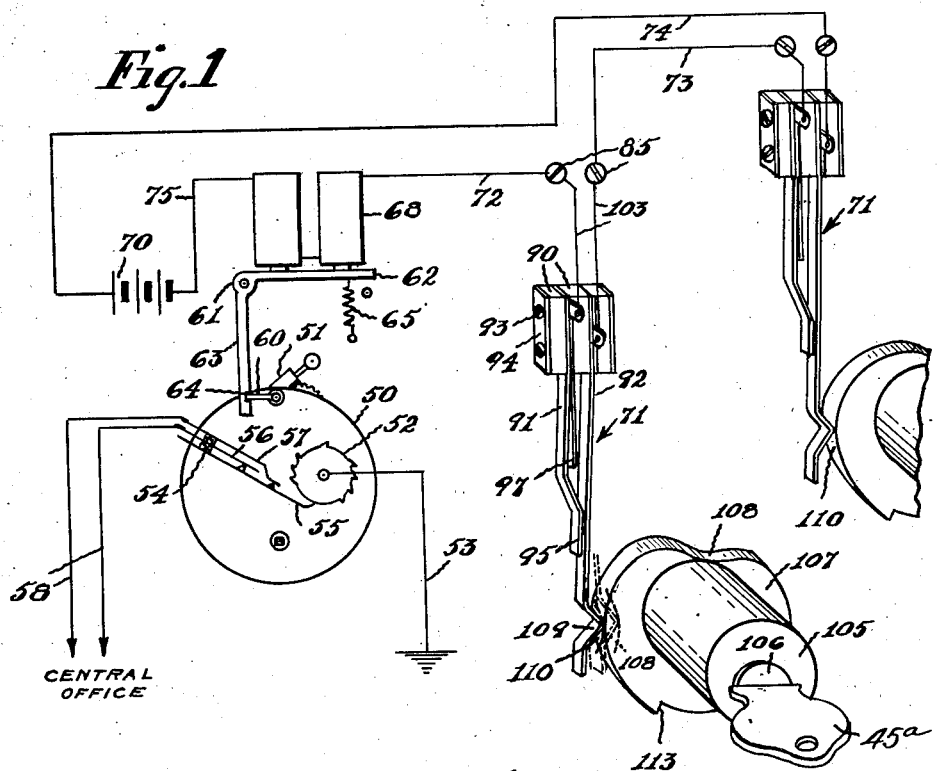
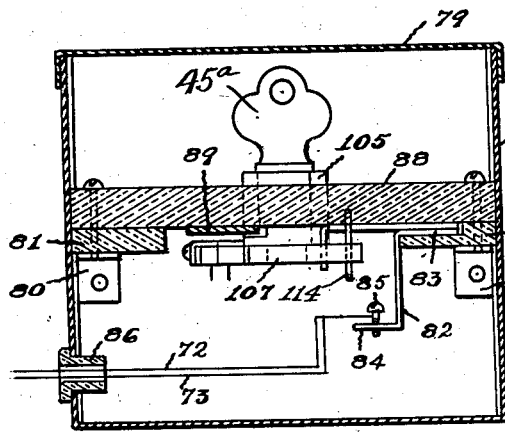
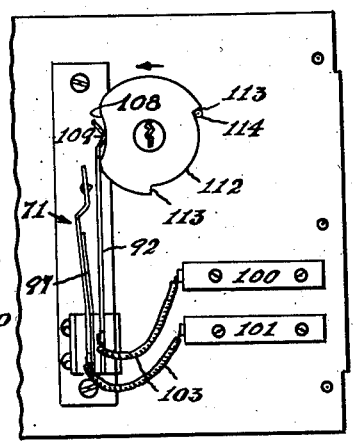
INVENTOR
Richard M. Hopkins,
BY
Harold D. Penney  ATTORNEY Feb. 19, 1935. R. M. HOPKINS 1,991,504
KEY TRAPPING VALVE LOCK FOR TRANSMITTER SUPERVISED SPRINKLER SYSTEMS.
Original Filed Sept. 12, 1928 3 Sheets-Sheet 2

INVENTOR
Richard M. Hopkins,
BY
Harold D. Penney ATTORNEY

Feb. 19, 1935.  R. M. HOPKINS  1,991,504
KEY TRAPPING VALVE LOCK FOR TRANSMITTER SUPERVISED SPRINKLER SYSTEMS
Original Filed Sept. 12, 1928   3 Sheets-Sheet 3
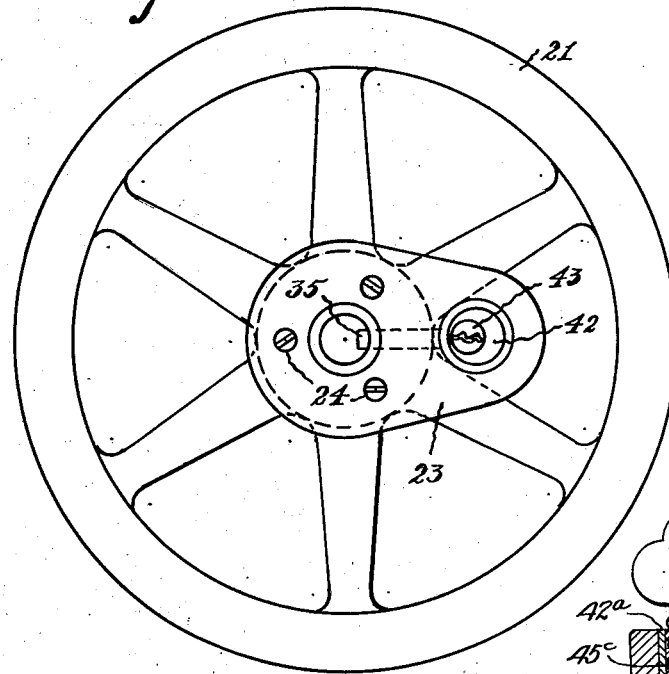
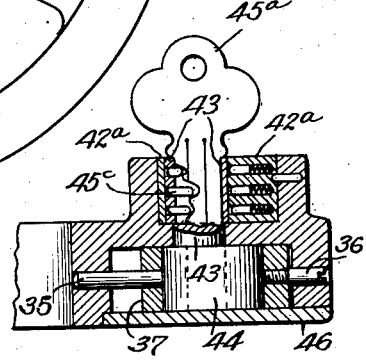
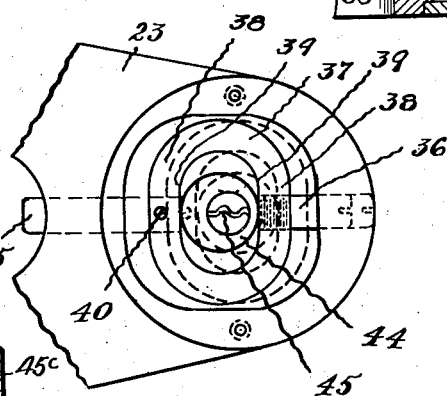
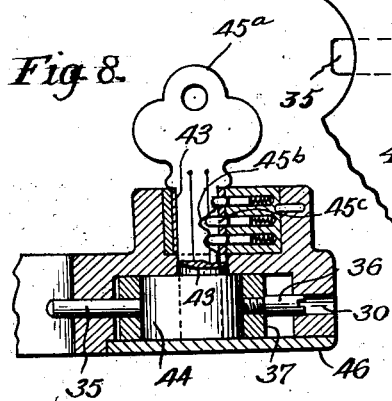
INVENTOR
Richard M. Hopkins,
BY
Harold D. Penney  ATTORNEY Patented Feb. 19, 1935

1,991,504

UNITED STATES PATENT OFFICE 1,991,504

KEY-TRAPPING VALVE LOCK FOR TRANSMITTER-SUPERVISED SPRINKLER SYSTEMS

Richard M. Hopkins, Rutherford, N. J., assignor to American District Telegraph Company, New York, N. Y., a corporation of New Jersey Original application September 12, 1928, Serial No. 305,465. Divided and this application November 28, 1932, Serial No. 644,701

3 Claims. (Cl. 70—124)

This invention relates to key-controlled devices, and more particularly to the key controlled valve locks shown in my copending application, Ser. No. 305,465 filed Sept. 12, 1928 for Lock-type supervised key gate valve system, of which the present application is a division.

Objects of the invention are to improve generally the simplicity and efficiency of such devices and to provide devices or apparatuses of this kind which are reliable, durable and economical to manufacture.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with an improved control apparatus which, briefly stated, may include one or more sprinkler systems having one or more normally open main valves or water gates each having a key-controlled lock carried on the wheel thereof for locking the valve in normally open position, said lock releasing the key only when said valve is locked in said normally open position and trapping the key in the lock when said valve is not in said normal position.

The control apparatus also includes a transmitter system for sending signals to a central office and one or more stations adapted to trap the keys, the system including a normally wound transmitter for sending a signal whenever a key is released from any station.

Thus when no signal has been received showing that a key has been released, it is known at the central office that all the keys are still trapped in the stations and, therefore, that the valves are locked open, since the key cannot be released from the lock except when the valve is locked open, and if the keys are in the stations the valves must be locked open.

When for any reason, as for instance, after a fire, it is necessary to close the valve, the key cannot be removed from any station without sending a signal that it is released.

Thus the central office is advised whenever the key is removed to close a valve, and may then send some one to see that all valves are again locked open, the keys replaced in the stations and the transmitter rewound.

In the accompanying drawings, showing by way of example, one of many possible embodiments of the invention, Fig. 1 is a diagrammatic view of the transmitter system;

Fig. 2 is a transverse vertical sectional view of the switch station;

Fig. 3 is a fragmental bottom plan of the switch.

Fig. 6 is a plan of the wheel and lock;

Fig. 7 is a fragmental bottom plan of the wheel lock, parts being removed;

Fig. 8 is an enlarged central vertical sectional view of the valve lock showing the key untrapped, and the lock bolt projected in position to lock the valve open;

Fig. 9 shows a similar section with the lock bolt retracted to unlock the valve, and the key trapped in the lock.

The sprinkler system

Figure 4:
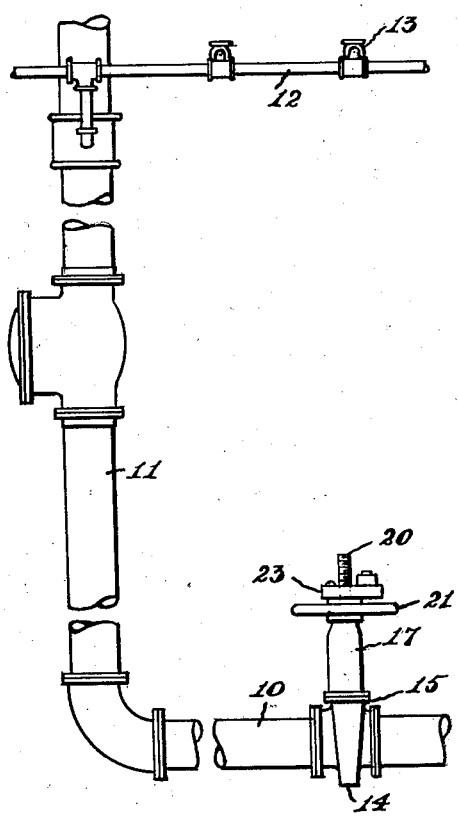
Fig. 4 is a fragmental side elevation showing a sprinkler system with the key-controlled lock applied thereto.

My transmitter and valve control apparatus are herein shown, by way of example, in connection with one or more sprinkler systems including a supply main 10 (Fig. 4) a riser 11, service pipes 12 having sprinkler heads 13 and a main water valve or gate 14, though a plurality of gates or other similar or different devices may be controlled as will appear.

The valve gate

Said valve or gate 14 is shown as having a seat 15 on which is mounted a bracket 17 (Fig. 5) thereon having a central bore and a boss 18 around the bore.

A threaded gate valve rod or stem 20 received in said central bore is received in a hand wheel 21 having a hub 22 resting on said boss and having a tapped opening alined with said central bore and receiving said stem 20.

The valve lock

An elongated lock housing 23 secured, by screws 24, fast on said hub of the wheel radial to the stem 20 is provided near the inner end with a vertical bore 25 receiving the stem and near the outer end with a lock chamber 26 having an upward cylindrical extension 27 surrounded by a boss 28.

Said housing is also provided with inner and outer alined axial bores 29 and 30 passing into the chamber and through the ends of the housing respectively, radial to the stem 20 and, when the valve is open, alined with a bolt receiving recess 31 and in radial to the stem 20.

A locking bolt 35 and threaded guide pin 36 in said inner and outer bores 29 and 30 respectively are secured fast to a horizontal cam ring 37 in said chamber 26 and formed with substantially parallel opposite portions 38 (Fig. 7) respectively having inner cam faces 39, and bores in which said bolt and pin are secured, the pin having threaded engagement with its bore, while the bolt is held by a set screw 40.

A cylinder lock 42 (Fig. 6) fast in said extension 27 of the chamber has a cylinder casing 42a in which is rotatable a pin cylinder 43 provided at its inner end with an eccentric disk shaped cam 44 (Fig. 7) engaging between said faces 39 whereby when the cylinder is rotated, the bolt 35 is reciprocated.

The key 45a for the lock is deeply intermediately notched, as at 49b as is usually the case, and said cylinder and the key hole 45 are positioned and constructed so that its tumbler 45c will in the position of Fig. 9, engage against the casing 42 and trap the key when the bolt 35 is retracted and the stem 20 is unlocked, and will release the key when the bolt is projected and (as in Fig. 8) the stem is locked in open position, whereby the presence of the key exterior to the lock shows that the gate is locked open.

A closure plate 46 (Fig. 5) closes the chamber 26 and prevents access to the ring 27 and cam 44.

The transmitter system

The key or keys which control the lock or locks 42 also control a key-controlled transmitting system (Fig. 1) comprising an enclosed normally wound supervisory transmitter 50 having an escapement 51, a toothed signal transmitting wheel 52, a ground connection 53 connected to the wheel, a make and break jack 54 having a pen 55 engaged by the wheel and a pair of contacts 56, 57 normally bridged by said pen and connected by the main circuit lines 58 to the central office.

For the sake of clearness, I show a somewhat modified or diagrammatic control means for said transmitter comprising a vibrating pin 60 on the escapement shaft, and a bell crank 61 comprising a normally raised armature 62 and a lower arm 63 provided with a notch 64 normally receiving the vibrating pin 60 whereby the transmitter is held from transmitting and unwinding.

A spring 65 is shown for yieldably lowering the armature and releasing the transmitter, when the armature is not held raised by an electromagnet 68 of a normally closed control circuit normally holding the armature raised and the transmitter inoperative.

Said circuit includes a source of current 70, one or more key-controlled switch stations or apparatus 71, and conductors 72, 73, 74, 75 connecting said magnet 68, source and apparatus in series.

The switch station

Said switch apparatus or station 71 is here shown, by way of example, as comprising a cabinet or container 78 (Fig. 2) having a cover 79, and mounting brackets 80 on opposite walls of the container supporting strips 81 of insulating material, on one of which strips rests a pair of similar contact plates one plate 82 being shown as hiding the other and having one end portion 83 mounted on strip, and the other end portion 84 off-set to a lower level in the container, and having a binding screw 85, said screw 85 and a similar screw in the other contact plate receiving said conductors 72, 73, or 74, passing in through the insulating bushing 86.

A panel 88 of insulating material secured on said strips 81 carries a switch base 89 mounted on the lower face of the panel.

The switch

A plurality of insulating blocks 90, and contact springs 91, 92 therebetween are mounted on the base, screws 93 and end plates 94 holding the blocks and springs together.

The shorter of said contact springs, the spring 91, is inwardly off-set to form a contact portion 95, and the longer spring 96 is the active or main spring and is engageable with the inner face of the portion 95 and tends by its own elasticity and set to move away from the shorter spring when left free.

A limiting spring or plate 97 mounted against the inner face of said shorter spring limits the inward movement of the spring 91 when main spring 92 moves therefrom.

A pair of contact members 100, 101 on the lower face of the panel in engagement with said contact plates 82 respectively are connected by conductors 103 with said contact springs respectively.

A cylinder lock 105 operable only by said valve lock key is vertically mounted in said panel 88 with the key receiving end uppermost and has its pin cylinder 106 provided at the lower end below the panel with a disk cam 107 having a deep peripheral cam notch 108 receiving an angular cam projection 109 on the spring 92 when the key is in releasing position, whereby when the key is released by the switch the switch is opened by the elasticity and set of the spring 92, the circuit broken, the armature 62 dropped, and signals sent to the central office until the transmitter 50 runs down.

The cylinder of said lock is movable to key-retaining position, the portion 110 of the disk cam engaging said projection at said key-retaining position having a radius sufficient to hold the switch closed, whereby as long as the key is trapped in the lock, the transmitter is held against sending a signal, the absence of the signal at the central office showing that the key has not been removed.

The cam disk 107 has a peripheral cut-away portion 112 having end shoulders 113 engageable by a stop pin 114 mounted in the panel and projecting into the cut-away portion between said shoulders for limiting the movement of the disk and lock cylinder, the shoulders being so positioned that the cylinder is stopped by one shoulder in key releasing, switch opening position, and by the other in key-trapping, switch closing position.

Operation of the system

Normally the valve gate 14 is locked open and the keys are trapped in the locks of the switch stations. When any key is removed from a lock 105 to close the gate, a signal is automatically sent to the central office advising of this fact.

Operation of the valve control

Figure 5:
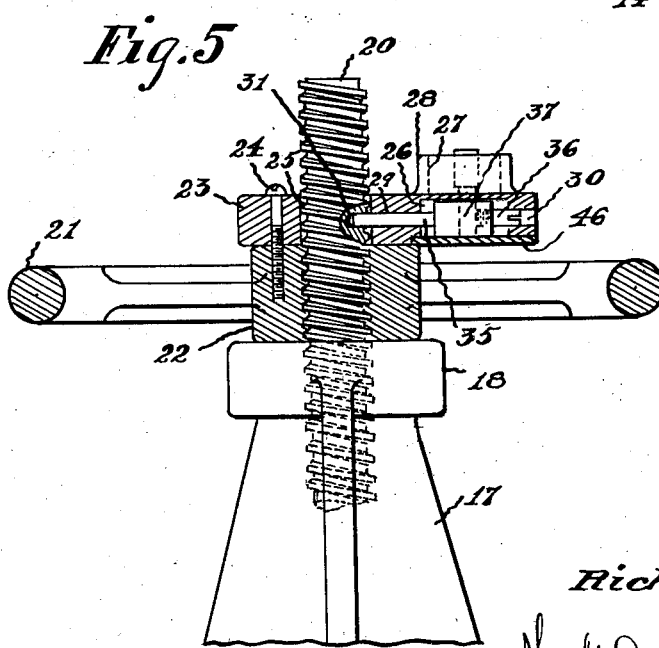
Fig. 5 is a central vertical sectional view, partly in elevation, showing the valve gate rod and wheel and the lock therefor.

The valve gate is normally open with the parts as shown in Fig. 5, the key being removed and trapped in a switch station lock 105. When the valve gate must be closed, the key is taken from the lock 105 inserted in the keyhole 45 (Fig. 7), and turned about 180 degrees, thus withdrawing the bolt and leaving the key in the lock.

This movement withdraws the bolt 35 from the recess 31, permitting the wheel to be rotated to close the valve, causing the recess 31 to move out of alinement with the bolt, thus preventing locking movement of the bolt and key and preventing removal of the key. Thus when the valve is in closed position, the key must be trapped in the lock 42 and cannot be in the switch station lock 105.

When the valve may again be opened, the wheel is rotated to raise the rod 20 and to bring the recess 31 into alinement with the bolt 35 permitting the key and bolt to be actuated to lock the rod and wheel and to permit the key to be removed and replaced in the switch lock.

Operation of the transmitter control

As stated, the valve gate 14 of the sprinkler system is normally open, the key has been removed from the lock 42, and is trapped in the switch lock 105 in the position of Fig. 1, and the transmitter 50 is wound up.

In this position of the key, the cam notch 108 is not opposite the cam projection 109, the portion 110 being opposite the cam projection whereby the switch is held closed, the armature held raised, and the pin 60 is held from vibration so that no signal is sent.

Releasing the key

If for any reason, as for instance, just after a fire, it is necessary to close the valve gate 14, the supervisory station or office must be informed, and the attendant is compelled to inform the office before he closes the valve, since it is not possible to remove the key from any switch lock without sending a signal.

When it is necessary to remove a key from a switch lock the attendant merely turns the key to untrapping position (Fig. 3), which opens the switch 71, breaks the electric circuit, drops the armature 62, and permits the transmitter to run down, thus sending signals to the central office.

After the fire, the sprinkler heads 13 are closed; the valves are locked open, releasing the keys; the keys are replaced in the locks 105 and turned to key-trapping, switch closing position; then the transmitter 50 is wound up, and the system is in order and ready to repeat the operation as above. If desired, some one may be sent from the central office to see that all is in order.

I claim as my invention:

1. In combination, a stationary gate-valve structure having a bore; a threaded gate-valve stem received in said bore and having therein a lateral bolt-receiving recess extending a short distance around and along the stem; a hand wheel engaging said structure when the valve stem is in open and closed positions and having an opening having threads receiving the threads of said stem; a lock housing secured fast on said wheel and provided with a bolt engageable in said recess when the valve stem is in open position and the bolt is projected and key-controlled means for controlling the bolt and adapted to house a key bit in the lock when the bolt is withdrawn, and to release the key when the bolt is projected into said recess.

2. Apparatus as in claim 1 in which said wheel and the lock housing fast thereon may be unscrewed from the stem by rotation of the wheel whenever the gate is closed and said bolt withdrawn.

3. Apparatus as in claim 1 in which said bolt is always out of register with said recess when the gate stem is in closed position.

RICHARD M. HOPKINS.